(12) United States Patent
Anyoji et al.

(10) Patent No.: US 7,347,056 B2
(45) Date of Patent: Mar. 25, 2008

(54) VEHICLE AIR-CONDITIONING SYSTEM

(75) Inventors: Hiroshi Anyoji, Wako (JP); Satoshi Horiguchi, Wako (JP); Masahiro Takagi, Wako (JP); Takayuki Iio, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 496 days.

(21) Appl. No.: 11/169,840

(22) Filed: Jun. 29, 2005

(65) Prior Publication Data
US 2006/0005552 A1   Jan. 12, 2006

(30) Foreign Application Priority Data
Jul. 9, 2004   (JP) .............................. 2004-203364

(51) Int. Cl.
*B60H 1/32*  (2006.01)
*F25D 21/00* (2006.01)
*F25B 39/04* (2006.01)
*F25B 1/00*  (2006.01)

(52) U.S. Cl. ............................ 62/133; 62/150; 62/184; 62/228.5

(58) Field of Classification Search .................. 62/133, 62/80, 150, 272, 181, 183, 184, 228.1, 228.5
See application file for complete search history.

(56) References Cited

U.S. PATENT DOCUMENTS

| 6,823,681 | B2 * | 11/2004 | Hirose et al. ................. 62/133 |
| 6,883,340 | B2 * | 4/2005  | Hirose et al. ................. 62/183 |
| 7,096,680 | B2 * | 8/2006  | Sugesawa et al. ............ 62/133 |
| 7,275,378 | B2 * | 10/2007 | Errington et al. ............. 62/133 |

FOREIGN PATENT DOCUMENTS

| JP | 61-20693  | 5/1986 |
| JP | 62-25522  | 6/1987 |
| JP | 63-17642  | 4/1988 |

* cited by examiner

*Primary Examiner*—Marc Norman
(74) *Attorney, Agent, or Firm*—Hamre, Schumann, Mueller & Larson, P.C.

(57) ABSTRACT

A vehicle air-conditioning system provided with a refrigeration cycle system is provided. The air-conditioning system includes an evaporator outlet air target temperature setting unit which sets the target temperature of air at an outlet of an evaporator at a predetermined temperature greater than or equal to a minimum temperature which is set for preventing freezing of the evaporator. The target temperature setting unit controls the predetermined temperature to the minimum temperature when the vehicle speed is lower than or equal to a predetermined vehicle speed.

2 Claims, 7 Drawing Sheets

VEHICLE AIR-CONDITIONING SYSTEM

FIELD OF THE INVENTION

The present invention relates to vehicle air-conditioning systems and, more particularly, to vehicle air-conditioning systems suitable for making the sound of a condenser fan hardly perceived as noise.

BACKGROUND OF THE INVENTION

A conventional cooling method in vehicle air-conditioning systems is a vapor compression method. As shown in FIG. 9, a refrigeration cycle in a vapor compression method is a closed circuit constituted by a compressor 100, a condenser 101, an expansion valve 102, and an evaporator 103. A refrigerant is circulated through the closed circuit to cool a passenger compartment, utilizing heat of evaporation of the refrigerant. This principle will be described along the flow of the refrigerant.

A liquefied refrigerant A passes through the expansion valve 102, adiabatically expanding to a reduced pressure and temperature, and in the form of a spray B, enters the evaporator 103, absorbing heat from air in the passenger compartment while evaporating, and in the form of a heated vapor C, is sucked into the compressor 100, adiabatically compressed, and in the form of a high-temperature high-pressure gas D, reaches the condenser 101, releasing heat outside, and returns to the initial state A.

In the above-described refrigeration cycle, to prevent the evaporator 103 from freezing, the compressor 100 is turned off when the evaporator outlet air temperature is lower than or equal to a minimum temperature, e.g., 4° C. For power saving of the compressor 100, the target temperature of evaporator outlet air at which to turn off the compressor 100 is set at a predetermined temperature greater than or equal to the minimum temperature, based on an outside air temperature and a target discharge temperature. The compressor 100 is turned off when the evaporator outlet air temperature is less than or equal to the predetermined temperature (see, e.g., Japanese Patent Laid-Open Publication Nos. SHO-62-25522 and SHO-63-17642).

After turned off, the compressor 100 is again turned on when the evaporator outlet air temperature rises 1° C. from the predetermined temperature, for example.

In an air-conditioning system disclosed in Japanese Patent Laid-Open Publication No. SHO-61-20693, when the compressor outlet refrigerant pressure is greater than or equal to a predetermined pressure, the speed of a condenser fan is switched from low speed to high speed because a condenser requires a relatively large amount of cooling air.

However, in a vehicle air-conditioning system having the above-described two characteristics, when the predetermined temperature is high, as compared to the case where it is low, the on-off operation of the compressor is repeated under high outlet pressure, increasing the rising speed of the outlet pressure. Consequently, the compressor outlet refrigerant pressure reaches the predetermined pressure in a shortened period of time after the compressor is turned on, and the condenser fan is switched from low speed to high speed at a relatively early stage. The occurrence of this phenomenon with a vehicle stopped causes the problem that passengers are likely to perceive it as noise. It is desirable to make it hardly perceived as noise.

SUMMARY OF THE INVENTION

According to the present invention, there is provided a vehicle air-conditioning system which comprises: a compressor for compressing a refrigerant; a condenser for condensing the refrigerant compressed by the compressor; a condenser fan for blowing cooling air to the condenser; an evaporator for cooling air-conditioning air by vaporizing the refrigerant; an evaporator outlet air target temperature setting means for setting a target temperature of air at an outlet of the evaporator at a predetermined temperature greater than or equal to a minimum temperature which is set for preventing freezing of the evaporator, based on an outside air temperature and a target discharge temperature; a compressor turning-off means for turning off the compressor when an air temperature at the outlet of the evaporator is lower than or equal to the predetermined temperature set by the evaporator outlet air target temperature setting means; and a condenser fan speed control means for switching the speed of the condenser fan from low speed to high speed when a refrigerant pressure at an outlet of the compressor is greater than or equal to a predetermined pressure, wherein the evaporator outlet air target temperature setting means sets the predetermined temperature at the minimum temperature when the vehicle speed is lower than or equal to a predetermined vehicle speed.

As described above, the evaporator outlet air target temperature setting unit sets the predetermined temperature at the minimum temperature when the vehicle speed is lower than or equal to the predetermined vehicle speed, and thus, as compared to the case where the predetermined temperature is high, allows the compressor outlet refrigerant pressure to rise at a reduced speed, and allows the condenser fan to keep rotating at low speed for a longer time correspondingly and to be hardly perceived as noise by passengers when the vehicle is stopped.

The predetermined vehicle speed preferably has hysteresis. Consequently, when the vehicle travels at low speed in a traffic jam, for example, the predetermined temperature can be prevented from changing repeatedly and changing the temperature of discharge into the passenger compartment each time, and thus the passenger compartment temperature can be stabilized to maintain passengers' good feeling on temperature control.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
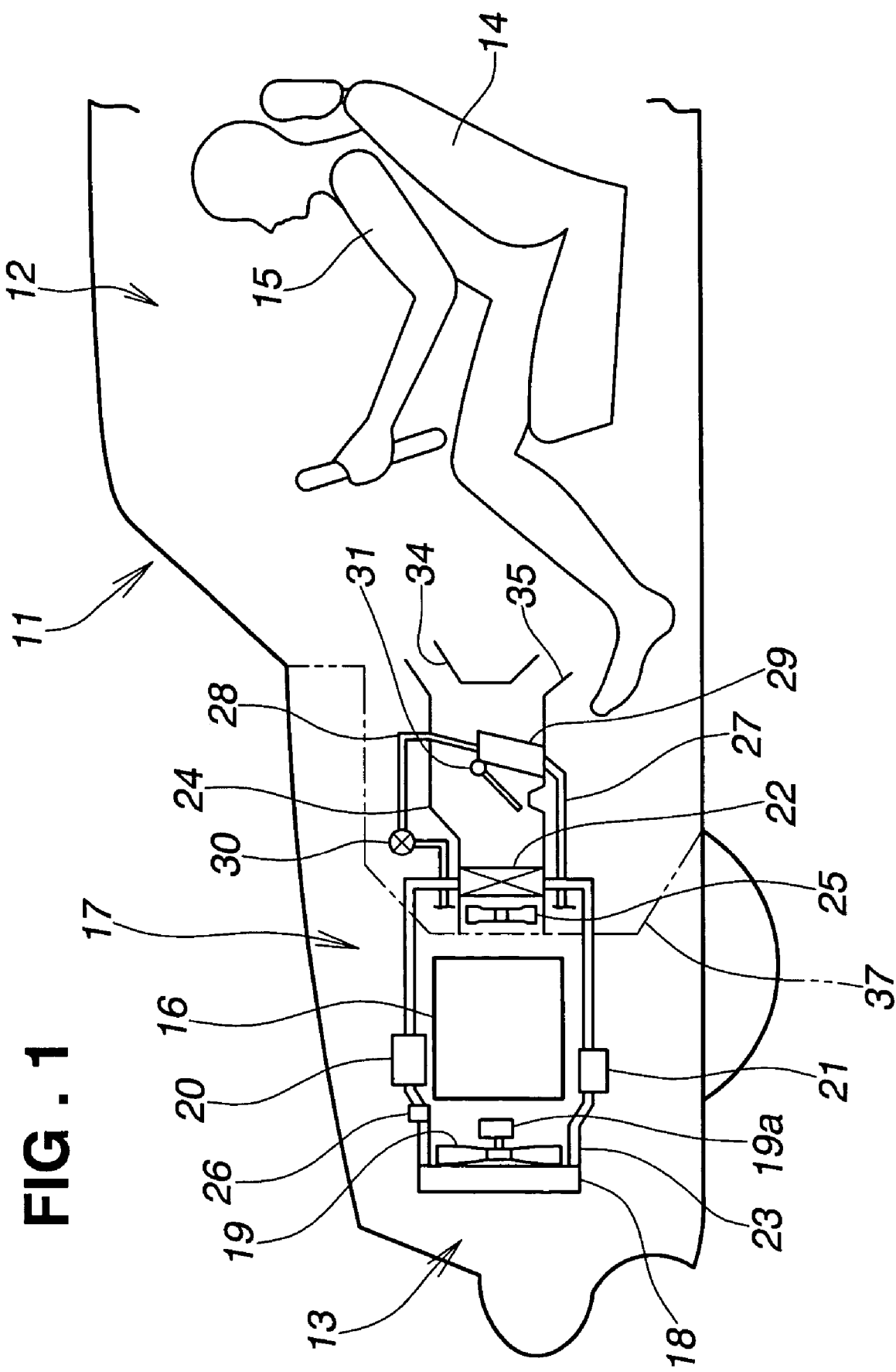
FIG. 1 is a partial schematic diagram of a vehicle equipped with a vehicle air-conditioning system according to the present invention.

FIG. 1 shows a passenger compartment 12 section and an engine compartment 13 section in an automobile 11. A driver 15 seated in a seat 14 is shown in the passenger compartment 12. An engine 16 is disposed in the engine compartment 13. A drive train for transmitting power outputted from the engine 16 is not shown.

Components related to an air-conditioning system 17 will be described. A condenser 18 and a condenser fan 19 are disposed in front of the engine 16. The condenser 18, a compressor 20, an expansion valve 21, and an evaporator 22 are connected by refrigerant piping 23 in a circular shape to form a refrigeration cycle. Reference numeral 19a denotes a fan motor.

The compressor 20 is driven by the engine 16 or a motor. The compressor 20 sucks in a low-temperature low-pressure gas refrigerant vaporized in the evaporator 22 from an inlet, and discharges a gas refrigerant compressed to a high temperature and high pressure from an outlet into the condenser 18.

The condenser 18 exchanges heat with outside air passing therethrough by the condenser fan 19 attached thereto, thereby condensing (liquefying) the high-temperature high-pressure gas refrigerant delivered from the compressor 20. The liquid refrigerant resulting from condensing the gas refrigerant is delivered into the expansion valve 21.

The expansion valve 21 depressurizes and expands the high-temperature high-pressure liquid refrigerant into a spray refrigerant (of a low temperature and low pressure).

The evaporator 22 is disposed in a vehicle air-conditioning duct 24 for cooling inlet air flowing through the air-conditioning duct 24 by allowing the inlet air passing therethrough by a blower fan 25 to exchange heat with the spray refrigerant.

A compressor outlet refrigerant pressure sensor 26 disposed in the refrigerant piping 23 connecting the compressor 20 to the condenser 18 detects a refrigerant outlet pressure at the compressor 20. A signal outputted from the sensor 26 is inputted into a controller shown in FIG. 2.

The air-conditioning system 17 forms a hot-water circulating path (heater circuit) with a pipe 27, a pipe 28, and a heater core 29 provided therebetween. The heater core 29 is a heat exchanger. In the circulating path, the heater core pipe 28 is provided with a water valve 30. The heater core 29 is disposed in the air-conditioning duct 24.

In the air-conditioning duct 24, there is provided, from the upstream side located on the engine compartment 13 side, the blower fan 25, the evaporator (interior heat exchanger) 22, an openable and closable air mix door 31, the heater core 29, and outlets 34 and 35. The evaporator 22 cools air blown from the blower fan (air blower) 25. The outlet 34 is a vent outlet. The outlet 35 is a foot outlet.

Figure 2:
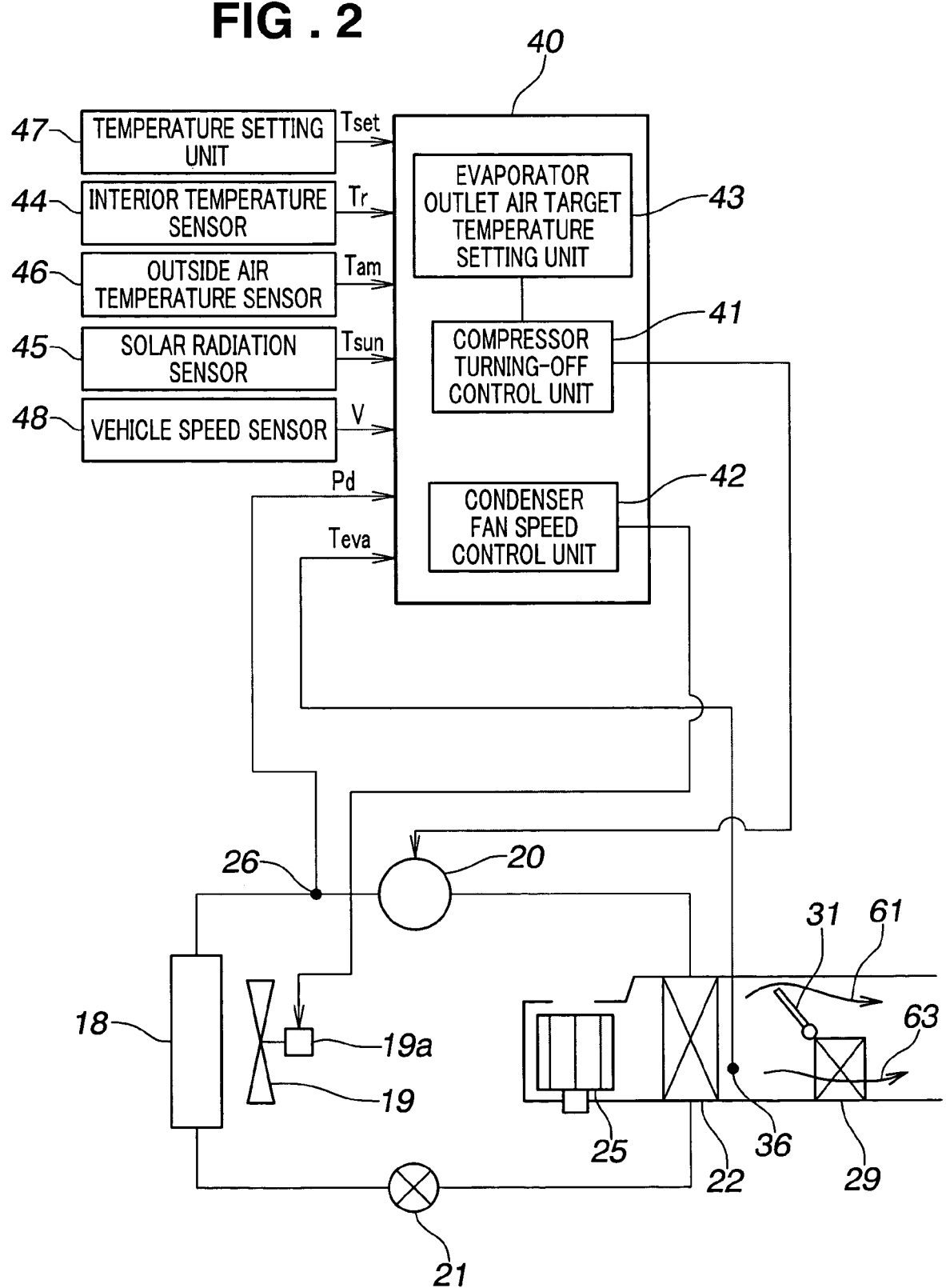
FIG. 2 is a diagram specifically showing the vehicle air-conditioning system shown in FIG. 1.

An evaporator outlet air temperature sensor 36 is disposed on the outlet side of the evaporator 22 in the air-conditioning duct 24 (see FIG. 2). The evaporator outlet air temperature sensor 36 detects evaporator outlet air temperature Teva. The sensor output is inputted into the controller.

In the air-conditioning duct 24, air flowing through the air-conditioning duct 24 is divided by the air mix door 31 into a portion caused to pass through the heater core 29 (hot-side air, an air portion 63 in FIG. 2) and a portion caused to bypass the heater core 29 (non-hot-side air, an air portion 61 in FIG. 2). In this manner, the configuration of the air-conditioning duct 24 can supply temperature-controlled air into the passenger compartment 12.

Referring to FIG. 1, the passenger compartment 12 is separated from the engine compartment 13 by a bulkhead 37.

In the above-described air-conditioning system 17, the evaporator 22 in the refrigeration cycle circuit can cool air passing therethrough to supply cool air into the passenger compartment 12.

FIG. 2 shows the configuration of the vehicle air-conditioning system 17 including a control system according to the present invention. The structure of the air-conditioning system 17 is as described above.

A controller 40 includes a compressor turning-off control unit 41 for sending a drive stop (off) signal to the compressor 20, a condenser fan speed control unit 42 for sending a speed control signal to the condenser fan 19, and an evaporator outlet air target temperature setting unit 43 for sending a command signal to the compressor turning-off control unit 41. The controller 40 is implemented by a computer mounted in the automobile 11.

The controller 40 receives, as input signals, Tr (a signal on the air temperature in the passenger compartment) from an interior temperature sensor 44, Tsun (a signal on the amount of solar radiation entering the passenger compartment) from a solar radiation sensor 45, Tam (a signal on the air temperature outside the passenger compartment) from an outside air temperature sensor 46, Tset (a signal on the set temperature of air in the passenger compartment) from a temperature setting unit 47, Teva (an evaporator outlet air temperature) from the evaporator outlet air temperature sensor 36, V (a vehicle speed) from a vehicle speed sensor 48, and Pd (a compressor outlet refrigerant pressure) from the compressor outlet refrigerant pressure sensor 26. Tset is a set temperature set by the driver. Tr, Tsun, Tam, Teva, V, and Pd are detection signals outputted from the corresponding sensors.

The controller 40 receiving the above various signals controls the on-off operation of the compressor 20 and the speed of the condenser fan 19, based on control flows and relational expressions which will be described below.

Next, the control of the controller 40 for setting the target temperature of evaporator outlet air will be described with reference to FIG. 2 and a flowchart shown in FIG. 3.

Figure 3:
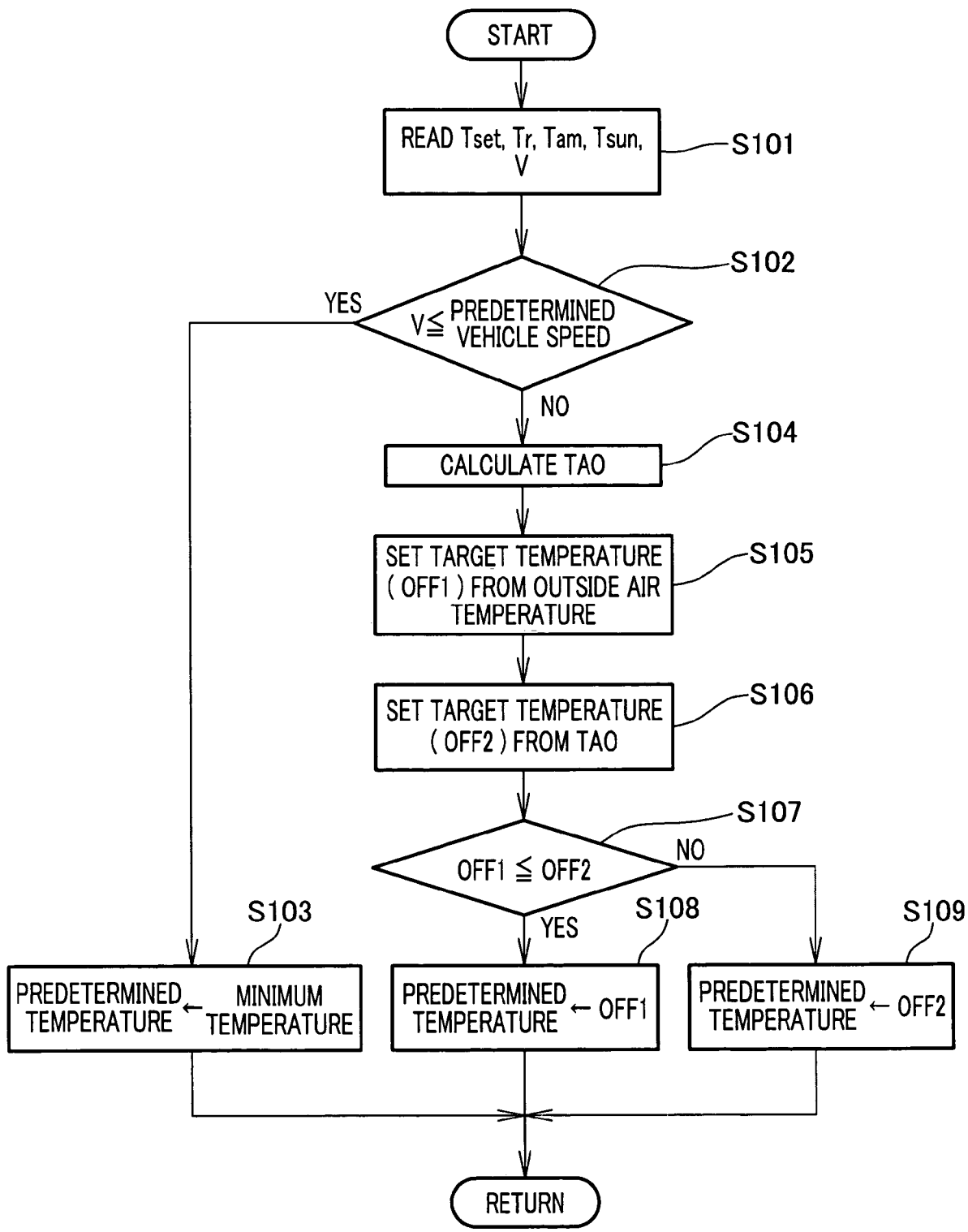
FIG. 3 is a flowchart of an evaporator outlet air target temperature setting unit in a controller shown in FIG. 2.

Referring to FIG. 3, in step (hereinafter abbreviated merely as S) 101, various signals are read. Here, the various signals are the above-described Tr, Tsun, Tam, Tset and V.

Figure 4:
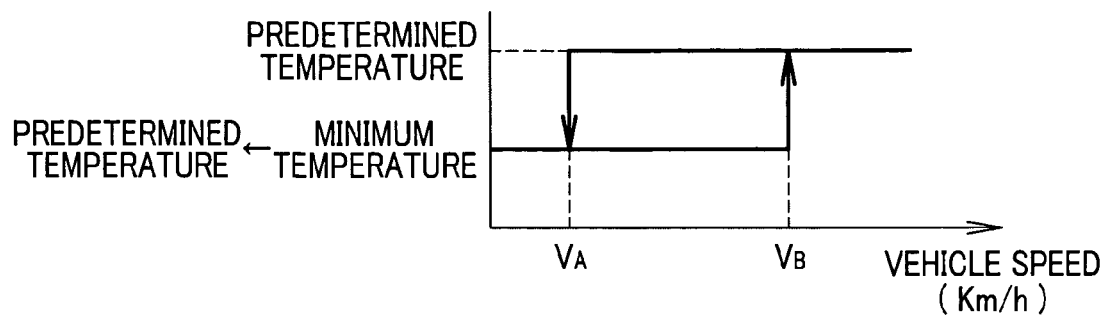
FIG. 4 is a graph showing the relationship between vehicle speed and target temperature.

In S102, it is determined whether the vehicle speed V is greater than a predetermined vehicle speed set as shown in FIG. 4.

In FIG. 4, the horizontal axis represents vehicle speed, and the vertical axis represents temperature. When the vehicle speed is reduced from a high speed, vehicle speed $V_A$ (e.g., 5 km/h) is used as the predetermined vehicle speed. When the vehicle speed becomes lower than or equal to the predetermined vehicle speed, a minimum temperature is used as the predetermined temperature. Until the vehicle speed rises from or below $V_A$ to $V_B$ (e.g., 20 km/h), the minimum temperature is maintained as the predetermined temperature. Thus, the predetermined vehicle speed has hysteresis, which can prevent, during low-speed travel such as travel in a traffic jam, the predetermined temperature from changing repeatedly and changing the temperature of discharge into the passenger compartment each time, and can stabilize the passenger compartment temperature to maintain passengers' good feeling on temperature control.

When, in S102, V is lower than or equal to the predetermined vehicle speed, in S103, the predetermined temperature is set at the minimum temperature. Then, the process returns.

Figure 5:
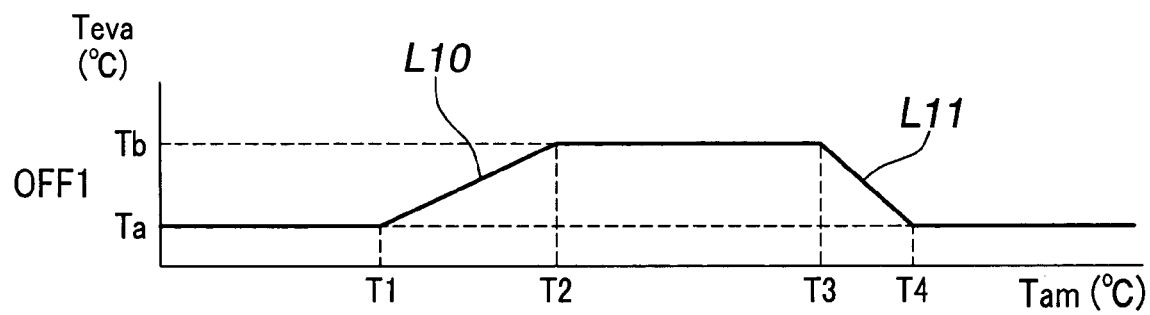
FIG. 5 is a map showing the relationship between outside air temperature and target temperature.

On the other hand, when the vehicle speed V is not lower than or equal to the predetermined vehicle speed in S102, the target discharge temperature (TAO) is calculated (S104) using the input signals read in S101, based on the following expression (1):

$$TAO=Kset*Tset-Kr*Tr-Kam*Tam-Ksun*Tsun+C \quad (1)$$

wherein:
- Tset: set temperature of air in the passenger compartment
- Tr: air temperature in the passenger compartment
- Tam: air temperature outside the passenger compartment
- Tsun: the amount of solar radiation entering the passenger compartment
- Kset, Kr, Kam, Ksun and C: control constants
- *: multiple mark In S105, a target temperature (OFF1) is set from Tam read in S101, based on a map shown in FIG. 5.

FIG. 5 is a map showing the target temperature OFF1 set with respect to the outside air temperature Tam. The horizontal axis represents the outside air temperature Tam, and the vertical axis represents the target temperature OFF1. When the outside air temperature Tam is lower than or equal to T1 (e.g., 5° C.), the target temperature OFF1 is Ta (e.g., 4° C.). When the outside air temperature Tam is between T1 and T2 (e.g., 15° C.), it is set according to straight line L10. When the outside air temperature Tam is between T2 and T3 (e.g., 31° C.), the target temperature OFF1 is Tb (e.g., 6° C.) and constant. When the outside air temperature Tam is between T3 and T4 (e.g., 35° C.), it is set according to straight line L11. When the outside air temperature Tam is greater than or equal to T4, the target temperature OFF1 is set at Ta and constant.

Figure 6:
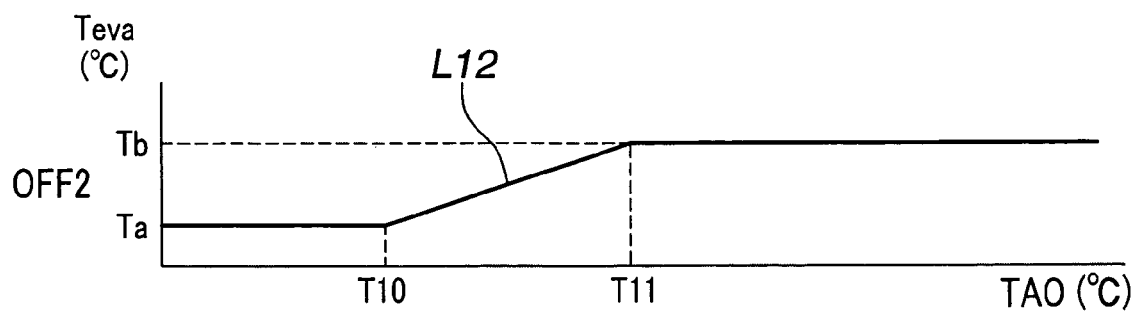
FIG. 6 is a map showing the relationship between target discharge temperature and target temperature.

In S106, a target temperature OFF2 is set from the calculated target discharge temperature TAO, based on a map shown in FIG. 6.

FIG. 6 is a map for setting the target temperature based on the target discharge temperature TAO. The horizontal axis represents the target discharge temperature TAO, and the vertical axis represents the target temperature OFF2.

When the target discharge temperature TAO is lower than or equal to T10 (e.g., 4° C.), the target temperature OFF2 is Ta and constant. When the target discharge temperature TAO is between T10 and T11 (e.g., 9° C.), the target temperature OFF2 changes according to straight line L12. When the target discharge temperature TAO is greater than or equal to T11, the target temperature OFF2 is Tb and constant.

In S107, the target temperatures OFF1 and OFF2 set in S105 and S106 are compared with each other. When OFF1 is lower than or equal to OFF2, the process proceeds to S108 in which the predetermined temperature is set at OFF1, and the process returns. When OFF1 is not lower than or equal to OFF2, the process proceeds to S109 in which the predetermined temperature is set at OFF2, and the process returns.

Figure 7:
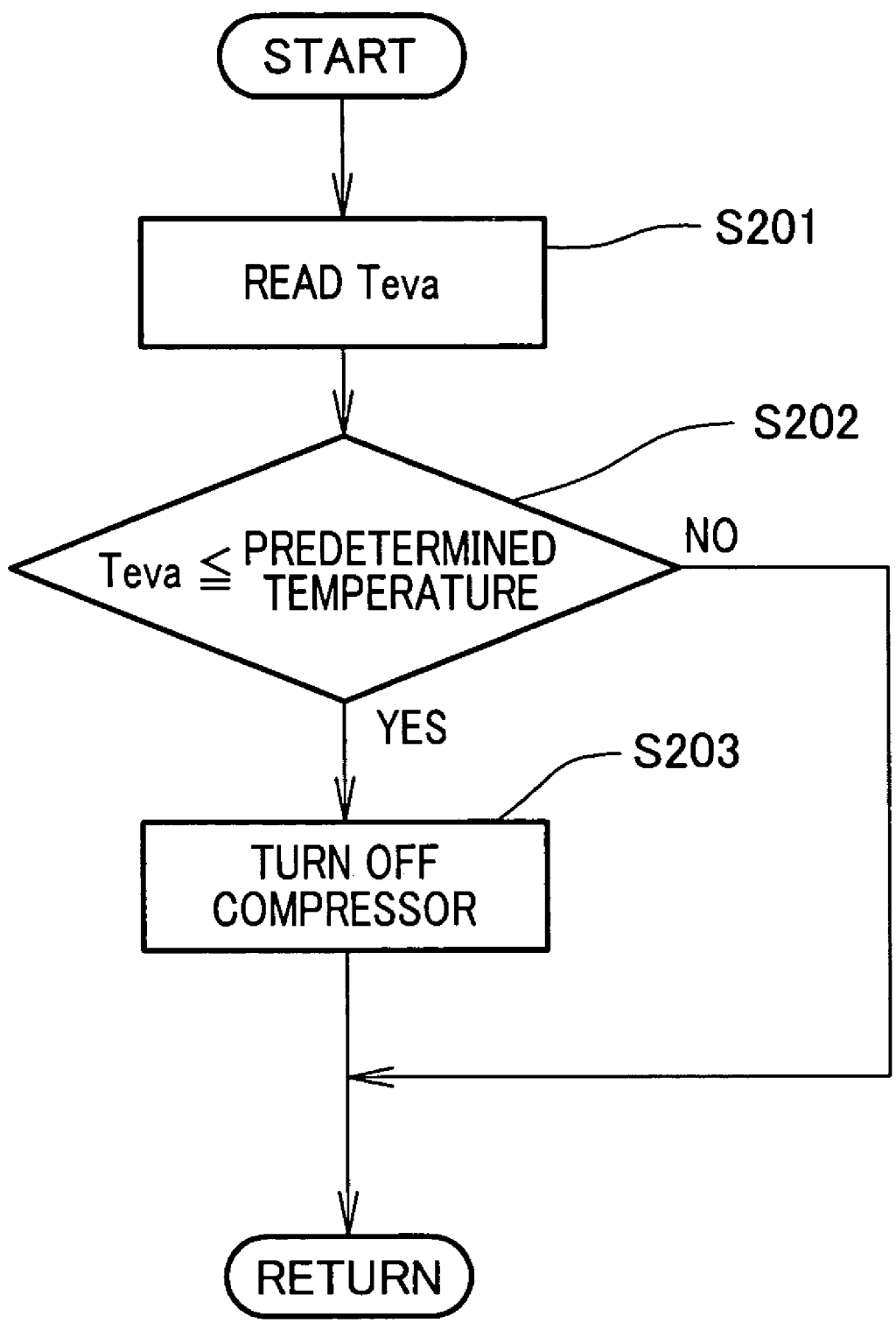
FIG. 7 is a flowchart for controlling the off operation of a compressor.

Next, the control of the controller 40 on the off operation of the compressor 20 will be described with reference to a flowchart shown in FIG. 7.

In S201, an input signal Teva is read.

In S202, it is determined whether Teva is smaller than the predetermined temperature determined as described above. When Teva is not lower than or equal to the predetermined temperature, the process returns. When Teva is lower than or equal to the predetermined temperature, the process proceeds to S203 in which the compressor turning-off control is performed, and then the process returns.

Figure 8:
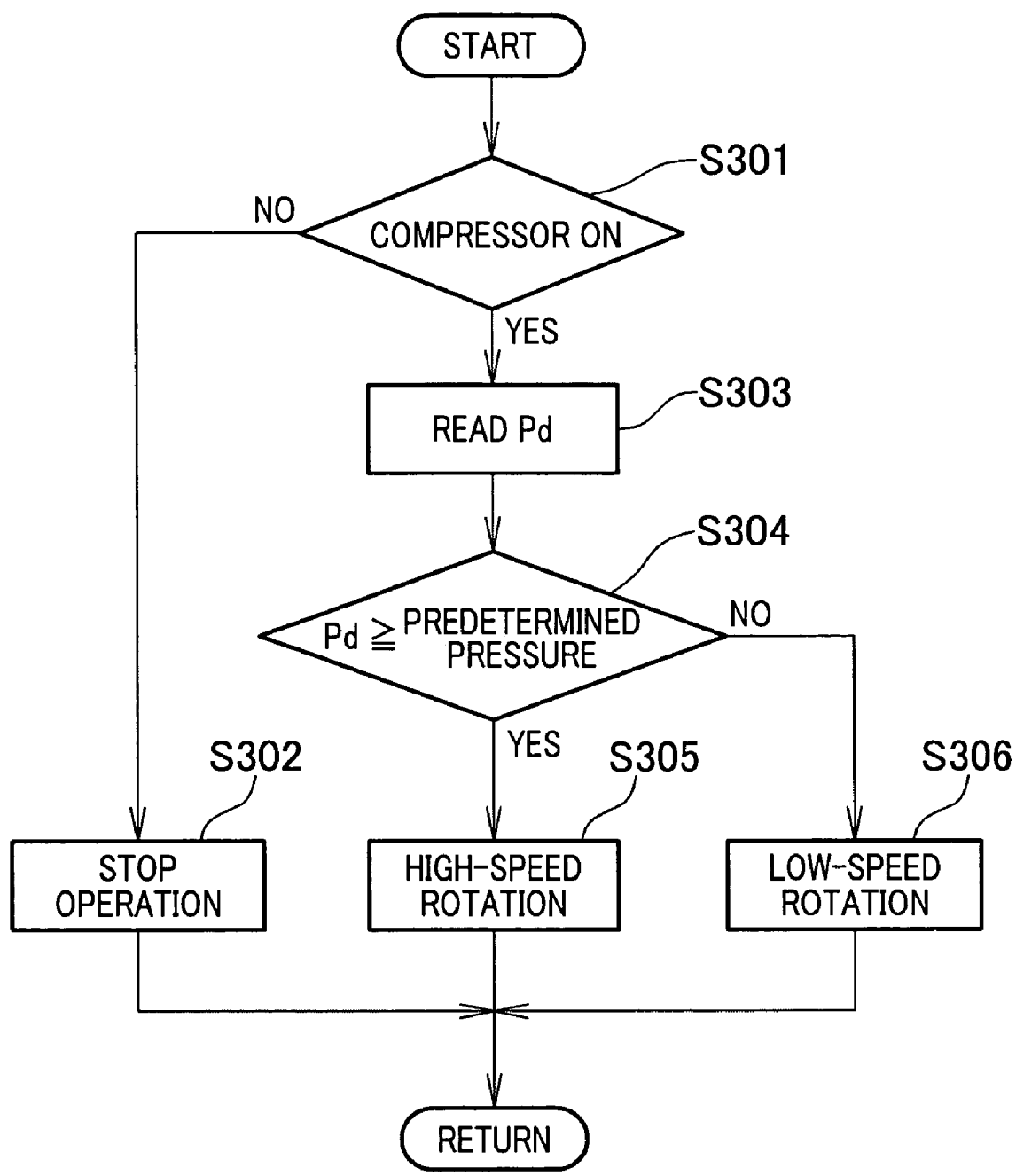
FIG. 8 is a flowchart of a condenser fan speed control unit.
Figure 9:
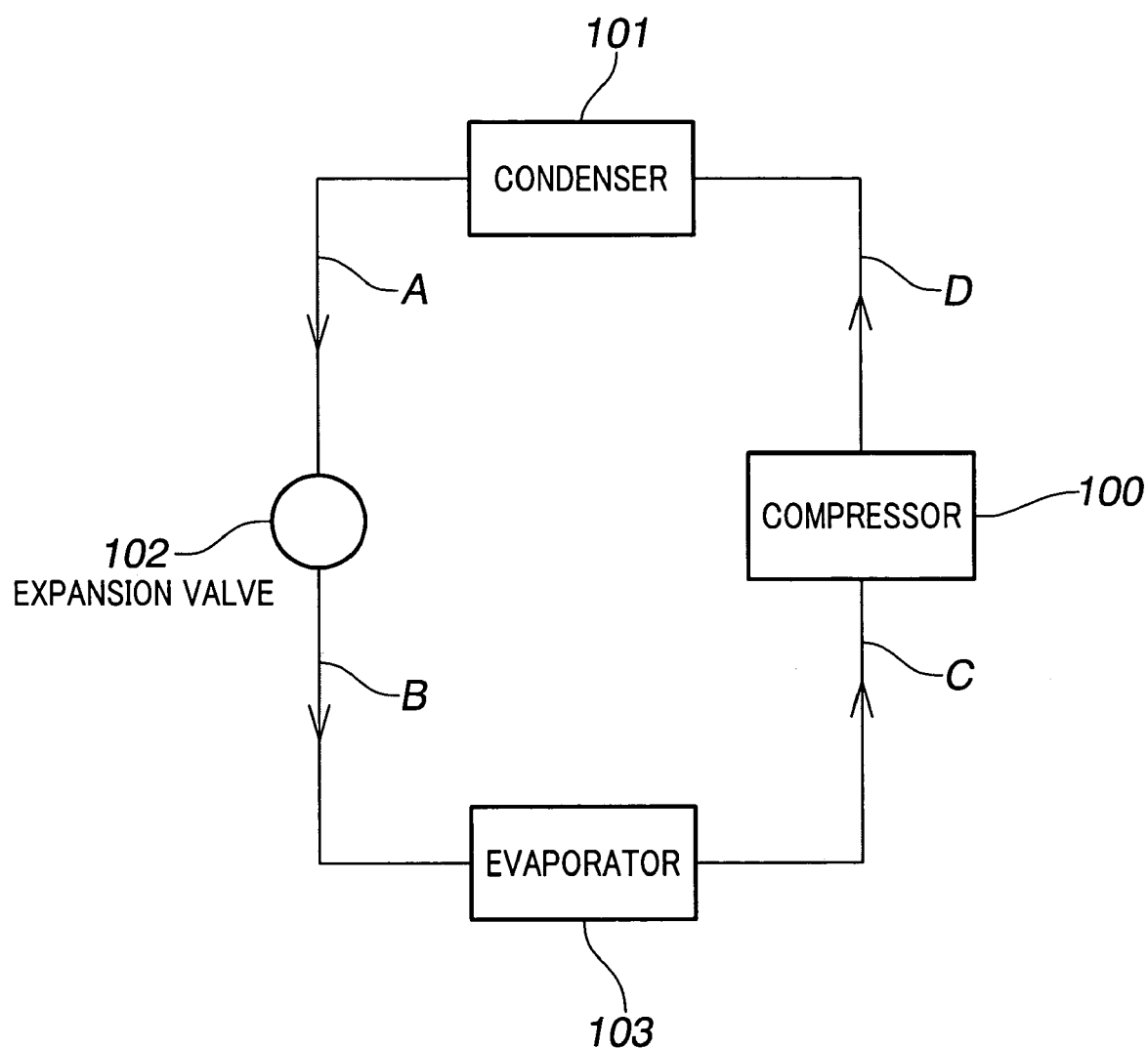
FIG. 9 is a diagram showing a refrigeration cycle in a conventional vapor compression method.

Next, the control of the controller 40 on the speed control of the condenser fan 19 will be described with reference to a flowchart shown in FIG. 8.

In S301, it is determined whether the compressor 20 is on. When the compressor 20 is not on, the process proceeds to S302 in which the operation is stopped, and then the process returns. When the compressor is on, the process proceeds to S303 in which Pd is read.

In S304, it is determined whether Pd is greater than or equal to a predetermined pressure (e.g., 1.5 MPa). When Pd is greater than or equal to the predetermined pressure, the process proceeds to S305 in which the condenser fan 19 is rotated at high speed, and then the process returns. When Pd is not greater than or equal to the predetermined pressure, the process proceeds to S306 in which the condenser fan 19 is rotated at low speed, and then the process returns.

As described above, the evaporator outlet air target temperature setting unit 43 sets the predetermined temperature at the minimum temperature when the vehicle speed is lower than or equal to the predetermined vehicle speed, and thus allows the compressor outlet refrigerant pressure to rise at a reduced speed, and allows the condenser fan 19 to keep rotating at low speed for a longer time correspondingly and to be hardly perceived as noise by passengers when the vehicle is stopped.

Obviously, various minor changes and modifications of the present invention are possible in the light of the above teaching. It is therefore to be understood that within the scope of the appended claims the invention may be practiced otherwise than as specifically described.

What is claimed is:

1. A vehicle air-conditioning system comprising:
    a compressor for compressing a refrigerant;
    a condenser for condensing the refrigerant compressed by the compressor;
    a condenser fan for blowing cooling air at the condenser;
    an evaporator for cooling air-conditioning air by vaporizing the refrigerant;
    an evaporator outlet air target temperature setting means for setting a target temperature of air at an outlet of the evaporator at a predetermined temperature greater than or equal to a minimum temperature which is set for preventing freezing of the evaporator, based on an outside air temperature and a target discharge temperature;
    a compressor turning-off means for turning off the compressor when an air temperature at the outlet of the evaporator is lower than or equal to the predetermined temperature set by the evaporator outlet air target temperature setting means; and
    a condenser fan speed control means for switching the speed of the condenser fan from low speed to high speed when a refrigerant pressure at an outlet of the compressor is greater than or equal to a predetermined pressure,
    wherein the evaporator outlet air target temperature setting means sets the predetermined temperature at the minimum temperature when the vehicle speed is lower than or equal to a predetermined vehicle speed.

2. An air-conditioning system as set forth in claim 1, wherein the predetermined vehicle speed has hysteresis.

* * * * *